Nov. 30, 1937.   R. CHILTON   2,100,631
TRANSMISSION
Filed Feb. 27, 1936   4 Sheets-Sheet 1

INVENTOR
ROLAND CHILTON
BY
ATTORNEY

Nov. 30, 1937.　　　　R. CHILTON　　　　2,100,631
TRANSMISSION
Filed Feb. 27, 1936　　　4 Sheets-Sheet 2
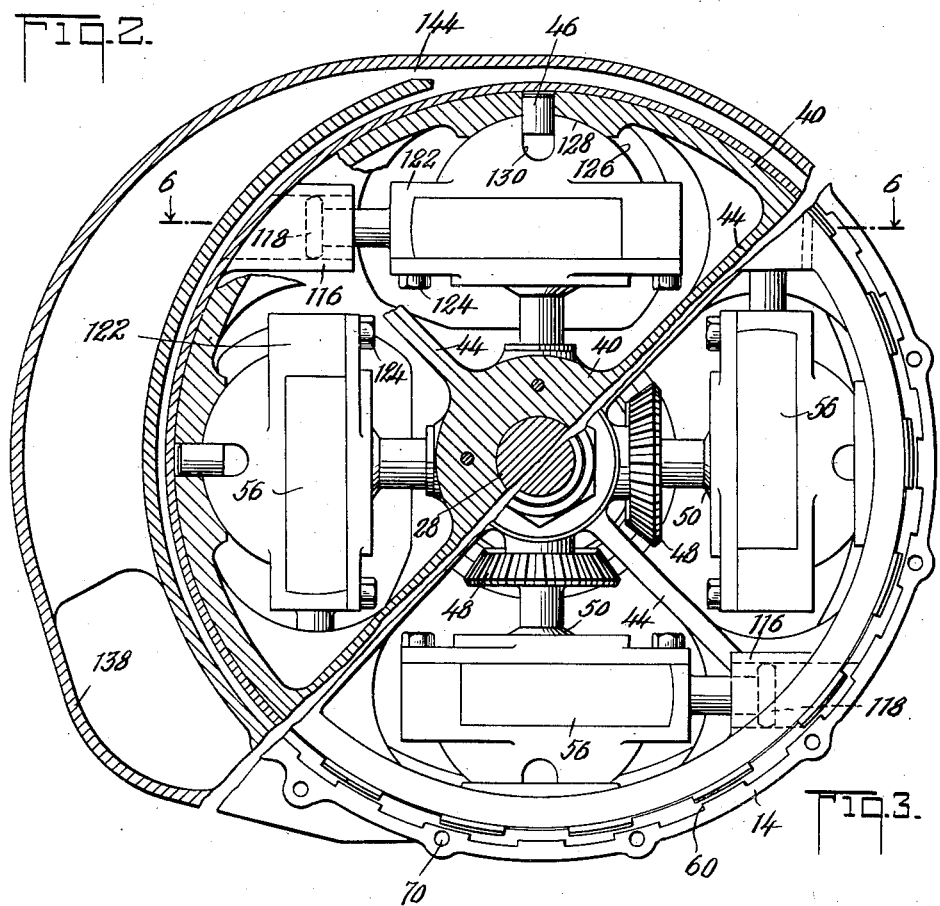
INVENTOR
ROLAND CHILTON
BY
ATTORNEY

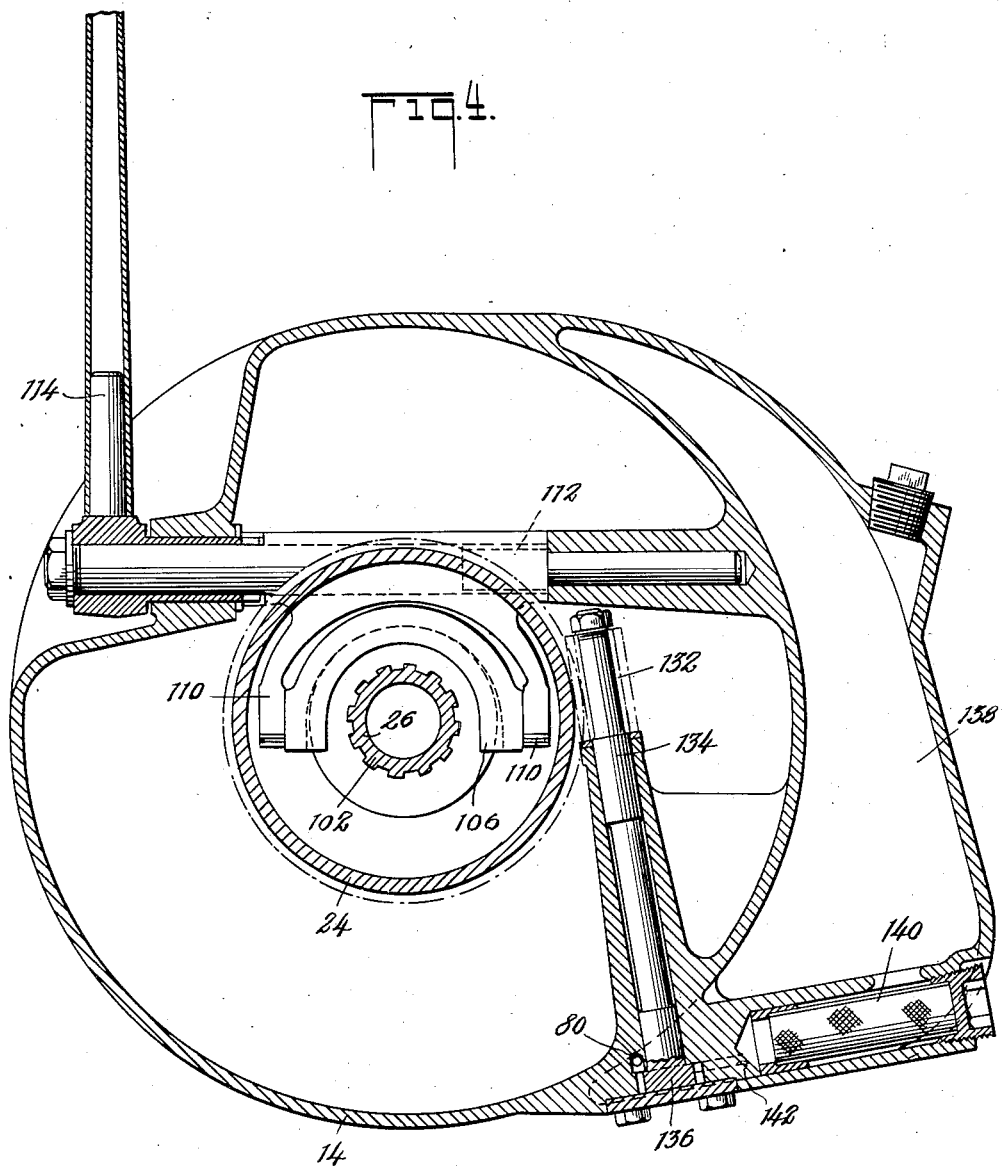

Nov. 30, 1937. R. CHILTON 2,100,631
TRANSMISSION
Filed Feb. 27, 1936 4 Sheets-Sheet 4

INVENTOR
ROLAND CHILTON
BY
ATTORNEY

Patented Nov. 30, 1937

2,100,631

UNITED STATES PATENT OFFICE 2,100,631

TRANSMISSION

Roland Chilton, Ridgewood, N. J.

Application February 27, 1936, Serial No. 65,974

18 Claims. (Cl. 74—281)

This invention relates to variable speed transmissions and, in certain aspects, comprises a continuing development on my series of co-pending applications including Serial Nos. 669,144; 728,058; 742,751; 742,752; 743,515; 746,958; 759,349; 25,065; 25,066; 40,919 and 40,920.

Included in those disclosures are radially elongate rollers rockably contacted with disc members for radial contact shift, for change in ratio, and certain of these cases teach the use of rollers contacting in pairs to attain a wide ratio range, in certain instances in conjunction with bevel gear roller driving means.

A prime object of the present invention is to adapt such bevel gearing into the changed environment comprised in the use of toroidal discs and an associated object is to extend the ratio range of such transmissions down to 1 to zero ratio and therebeyond into reverse ratios in spite of the fact that it is impossible to achieve such low speed ratios in the actual diameters of the roller contact circles upon the discs.

A further object is to provide a simplified form of control for the ratio changing precession of the rollers, and one which is more economical in cost, weight and bulk than the devices of the prior art and which is well adapted to the requirements of a double-sided transmission wherein two sets of rollers are to be controlled in unison, and one suitable to control planetizing rollers.

A still further object is to provide a new and improved roller supporting and driving means, and yet another object is to provide a simplified form of hydraulic torque-responsive contact loading means.

Other objects and advantages will be obvious from or will be pointed out in the folowing description with reference to the drawings, in which:

Fig. 2 is a transverse segmental section on the line 2—2 of Fig. 1 with the rollers in outside view.

Fig. 3 is a transverse segmental end view with the rear cover and disc removed;

Fig. 4 is a transverse section on the line 4—4 of Fig. 1;

Figure 1:
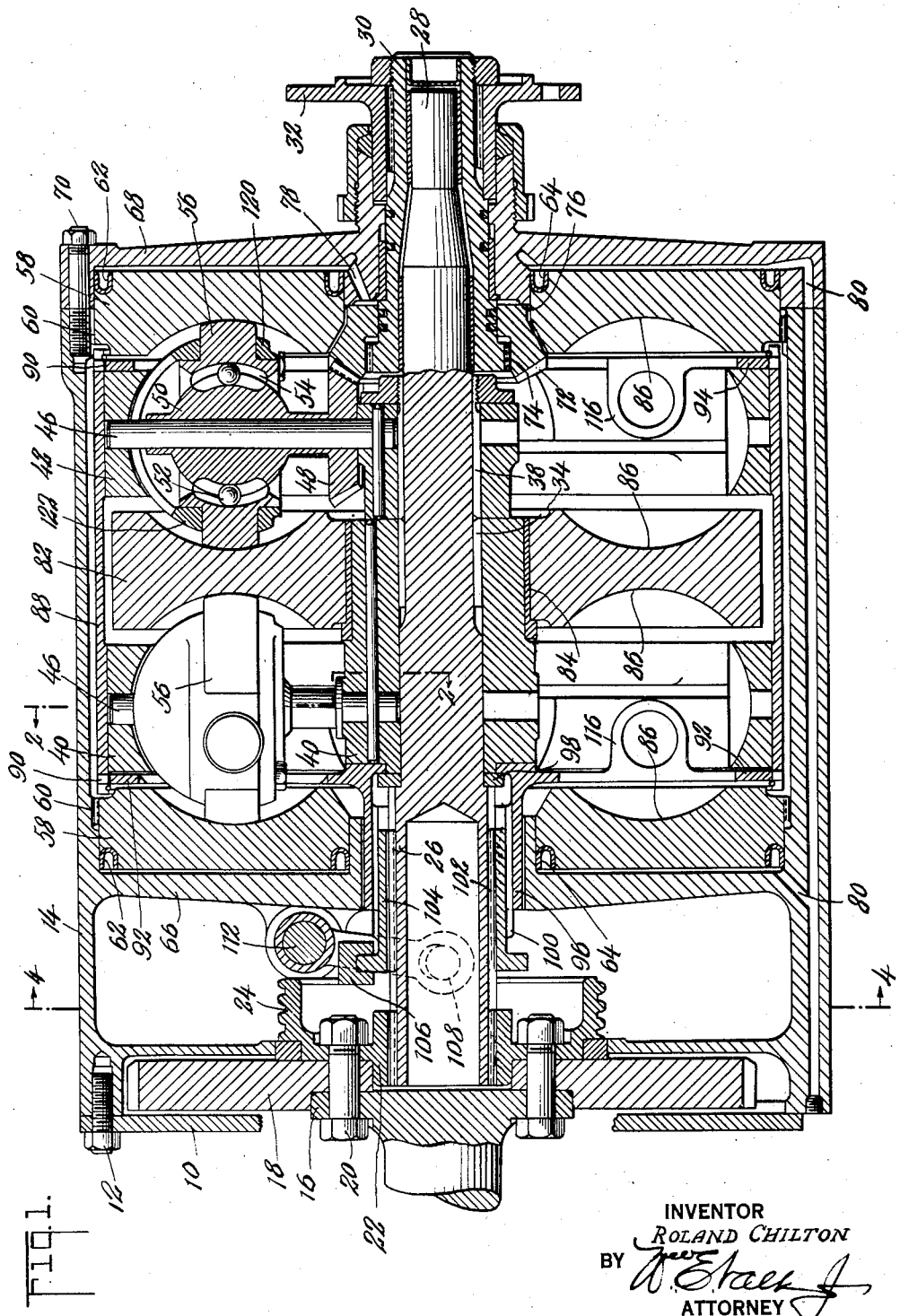
Fig. 1 is an axial section through a transmission embodying the invention with one upper roller shown in outside view, the other in section, and the lower rollers omitted to show other parts.

Referring first to Fig. 1, 10 designates the back plate of a conventional engine to which is secured, by studs 12, a transmission housing 14. The engine has the usual crankshaft flange 16, to which the usual flywheel 18 is secured by bolts 20, which also secure a splined driving hub 22, integral with a pump driving helical gear 24.

Splined into the driving hub 22 is a main or driving shaft 26, having piloted on its rear end 28 a driven shaft 30, equipped with the usual coupling flange 32.

Figure 5:
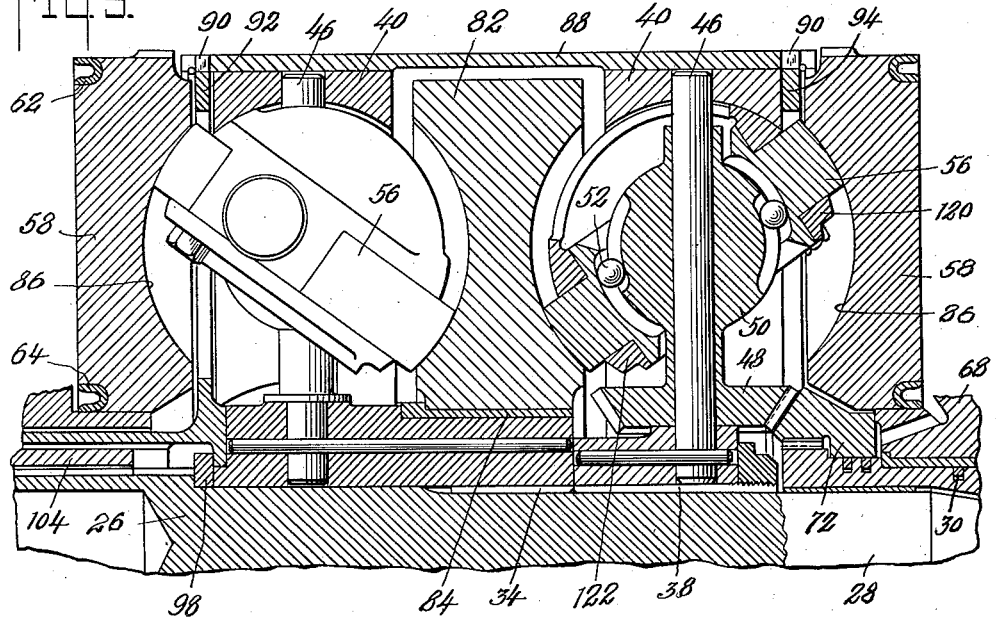
Fig. 5 represents a portion of Fig. 1 with rollers shown in tipped position.

Splined onto the driving shaft at 34—38 are a front cage or roller carrier 40, and a rear cage 42, having spokes 44 (Fig. 2), defining openings traversed by radial spindles 46, on which are rotatably mounted roller driving members comprising bevel gears 48, and spheres 50 comprising, with balls 52, and arcuate tracks 54, a universal driving coupling on which rollers 56 are free to angulate as indicated in the fragmentary view of Fig. 5, but whereby the rollers 56 are constrained to unitary rotation with the bevel gears 48.

Similar end discs 58 are held from rotation in the housing 14 by splines 60, and are equipped with hydraulic sealing rings 62—64, to comprise annular pistons slidable in the annular cylinder elements 66—68, the latter comprising a rear cover secured to the housing 14, by studs 70.

Meshed with the bevel gears 48 is a driven bevel gear 72, splined at 74, for rotation with the driven shaft 30, and abutting an annular seat 76 in the rear cover 68, to comprise a hydraulic relief valve communicating, by a hole 78, with the rear piston 58, and thence by the passage 80, with the front disc 58.

An intermediate disc 82 is mounted on a bushing 84, for free rotation upon the hub of the roller carrier 40. The discs 58 and 82 are provided with toroidal faces 86 engaging the rollers as shown.

Surrounding the cages 40—42, and free for limited rotation thereon, is a control drum 88, into the ends of which are splined at 90, control discs 92—94, the former being provided with a hub 96 and being located upon the cage 40 by a washer 98. The control disc hub 96 has helical splines 100 and engaged with these splines and with splines 102 on the main shaft 26, is a control sleeve 104, movable axially through a yoke 106, having trunnions 108, engaged by a fork lever 110, secured to a shaft 112, equipped with a control lever 114. Each of the control discs 92—94, is equipped with tangential bosses 116, in the bores of which are engaged sphericalized heads 118, of roller control members comprising inner and outer portions 120—122, secured together by bolts 124, to embrace the rollers 56, for rotation thereof as shown. The outer portions 122, are spherical at 126, to engage spherical seats 128 in the cages 40—42, and are slotted at 130 to clear the spindles 46 as the roller assemblages angulate.

Meshed with the helical gear 24 is the helical pinion 132 (Fig. 4) secured on a shaft 134 of a gear pump 136, which draws oil from an oil reservoir 138, through a filter 140 and passage 142, and delivers to the passage 80. The sump 138 has a high level bailing slot 144, whereby oil is returned to the sump by the rotation of the drum 88.

The operation of the transmission is as follows: First as regards the hydraulic torque-responsive contact loading means. As soon as the shaft 26 starts rotating, the oil pump 136 delivers oil to the pistons comprised by the discs 58 through the passage 80 and through the passage 78, to the space defined between the annular relief valve seat 76 and the cooperating face of the driven bevel gear 72. It will be seen that the tooth pressure on this gear and therefore the axial thrust reaction therefrom, is at all times proportional to the instantaneous torque on the driven flange 32. This gear is allowed some very slight axial freedom whereby the oil pressure is regulated by leakage past the seat 76 whereby the oil pressure in the entire hydraulic system is continuously maintained proportional to the driven torque, thus contact loading the discs 58 against the rollers 56 and these in turn against the intermediate disc 82, in like proportion.

Secondly, as to the ratio changing organization, it will be clear that the planetary speed of the rollers 56, and with them the bevel gears 48, varies with the rocked position of the rollers. It will also be obvious that there is a planetary speed of rotation of the bevel gears 48, corresponding to zero rotation of the driven gear 72, this being attained in the case of the showing when the roller contacts on the fixed discs 58 are towards the inner portion of the toroids. (It being remembered that the bevel gears 48 are held to unitary rotation with the rollers 56 by means of the universal driving couplings therebetween 50—52—54.) With the proportions shown 1:1 ratio will occur in the roller position of Fig. 5; and beyond the zero position the rotation of the driven shaft is reversed.

It will be noted that only the right hand set of rollers has been shown as equipped with bevel gears 48, engaging the single driven bevel gear 72, a simplified construction which results in increased gear tooth loads, as compared with a symmetrical construction wherein the other set of rollers would be equipped with duplicate gears. At first sight it would appear that the single set of gears would throw an undue proportion of the driving duty on the associated rollers but a complete analysis shows that the two sets of rollers must share the driving load equally even though the power appears to be taken off one set only. This apparent paradox results from the fact that the roller carrying cages 40—42 are restrained to unitary rotation by the driving shaft 26; that the outer discs 58 are both held to zero rotation, and that the intermediate toroids are common to the single intermediate disc 82.

Figure 6:
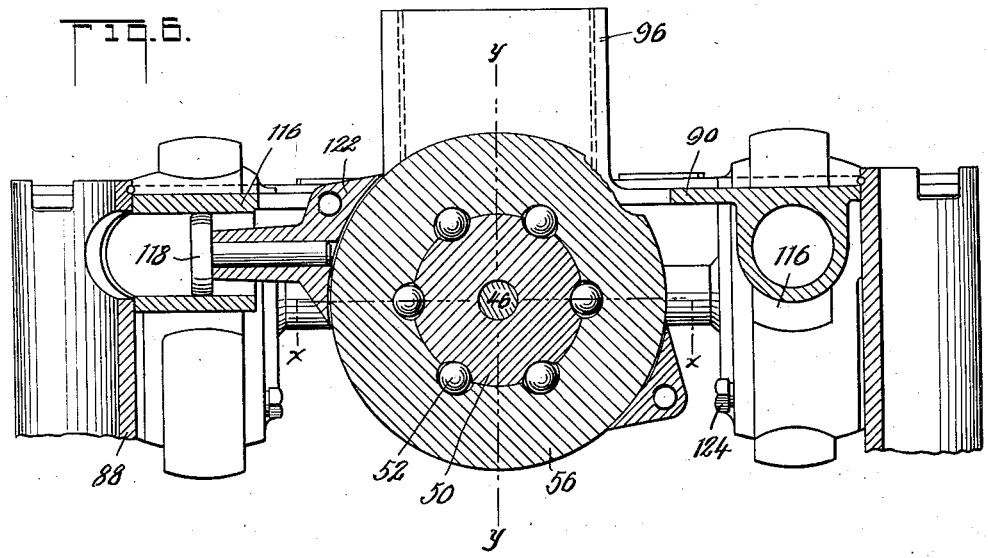
Fig. 6 is a fragmentary plan section on the line 6—6 of Fig. 2.

The operation of the control system is as follows: It should first be noted that the control heads 118 of the roller control member 120—122 are offset from the axis 46 of the roller, as clearly seen in the fragmentary view of Fig. 6. Accordingly, any rotational effort on the control drum 88, carrying the bosses 116, in which these heads are engaged, tends to rotate the rollers in ratio changing sense about the axis XX (Fig. 6) but, such movement being resisted by the heavy contact pressures between the rollers and discs, the initial effect is to tilt the rollers about the axis Y—Y (Fig. 6) slightly off their normal tangential relation with the disc contact circles. This in effect "steers" the rollers, which immediately precess inward on one toroid and outward on the other and such precession tends to move the control heads 118 inwards or outwards, as the case may be. As long as this motion is followed up by the bosses 116, the off-tangency relation, and therefore the precession of the rollers, continues, but instantly the bosses 116 are immobilized relative to the cages 40—42, the next increment of precession restores the tangential relationship whereby the rollers are stabilized against further precession until the control drum 88 is again advanced or retarded relative to the cages 40—42. The relative advance and retard control of these rotating members is attained through the helical conformation of the spline 100 (rotating with the drum 88) relative to the spline 102 (rotating with the cages 40—42) responsively to axial movement of the mating splines with the control sleeve 104, by means of the yoke 106, fork 110, and shaft 112, from the control lever 114 as previously described.

The control system just described represents a great simplification over the relatively elaborate structures used in the prior art and affords a sensitive, follow-up control action to planetizing rollers.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a transmission, in combination, coaxial toroidal discs, rollers to be controllably tilted to initiate precession across said discs, roller control arms having heads offset from the axes of tilting and precession, said arms being extended at right angles to the respective roller axes, and a member controllably rotatable on the co-axis and having bores within which said heads are slidably articulated.

2. In a transmission, in combination, coaxial toroidal discs, rollers tiltable therebetween about rectangularly related axes, control arms extending from said rollers laterally of the roller axes in offset relation to said axes of tilting, and means organized for oscillation about the co-axis and articulately supporting said arms.

3. In a transmission, in combination, coaxial discs, a roller carrier, a control member rotatable relative to said carrier and having tangential bores, rollers contacting said discs and organized for tilting about the contact axes and for resultant precession about tangential axes at right angles thereto, and control arms engaging said rollers and fitted for plunging articulation in said bores in offset relation to both said axes.

4. In a transmission, in combination, coaxial toroidal discs, a control member rotatable about said axis, rollers engaging the discs, means carrying the rollers for angulation about two rectangularly related axes, control arms extending laterally of the roller axes and organized for angulation with the rollers, and means on said member articulately supporting said arms.

5. In a transmission, in combination, a roller to be precessed, a control arm extending laterally from said roller and offset from the axis thereof, a roller carrier, a control drum rotatable relative to said carrier and having a tangential bore engaging the extended end of said arm, and means to control the rotation of said drum relative to said carrier.

6. In a transmission, in combination, an hydraulic piston to be loaded, a pump serving said piston, a transmission gear subject to torque-responsive thrust, and hydraulic gear thrust sustaining means comprising a pressure regulating relief valve for said pump.

7. In a transmission, in combination, a piston to be torque-responsively loaded, a bevel gear subject to transmission torque, a pump, and a bevel gear thrust sustaining means comprising a pressure regulating relief valve for said pump.

8. In a transmission, in combination, a toroidal disc comprising a piston, a roller contacting said toroid, a pump hydraulically connected to said piston, and torque-responsive means comprising a pressure regulating valve for said pump.

9. In a transmission, in combination, a gear subject to the torque transmitted and generating axial thrust therefrom, gear thrust sustaining means comprising an hydraulic pressure regulating relief valve, a pump controlled by said valve, a piston hydraulically connected to said pump and valve, and transmission means loaded by said piston.

10. In a transmission, in combination, a rotary carrier, planetary bevel gears on radial axes therein, rollers tiltable on tangential axes, universal joints connecting said rollers and gears for unitary rotation, a sun bevel gear meshed with said roller gears, and toroidal discs drivably contacting said rollers.

11. In a transmission, in combination, a carrier comprising radial axles, bevel gears mounted for rotation thereon, rollers mounted for rotation with and angulation with respect to said gears, opposed toroidal discs drivably engaging said rollers, and a bevel gear concentric with said discs and engaging the first said gears.

12. In a transmission, in combination, coaxial toroidal discs, disc connecting rollers precessible therebetween, bevel gears connected for unitary rotation with said rollers, and a sun gear on said co-axis meshed with said roller gears.

13. A transmission including, in combination, coaxial discs having opposed toroidal faces, rollers rockable for contact shift across said toroids, bevel gears, universal joints enforcing unitary rotation of said rollers and gears, and permitting said rocking, and a bevel gear on said co-axis meshed with said roller gears.

14. A transmission including, in combination, a drive shaft, a pair of roller cages mounted for unitary rotation therewith, sets of rollers mounted for planetization in respective cages, a toroidal disc engaged between said rollers, and end toroidal discs also engaging said rollers and comprising hydraulic pistons.

15. A transmission including, in combination, toroidal discs, bevel gears, rollers precessible for contact shift across said discs, universal joints connecting said rollers for unitary rotation with said gears during said precession, and a sun bevel gear meshed with said roller gears.

16. A transmission including, in combination, a pair of coaxial toroidal discs, radial spindles, bevel gears having spherical extensions rotatable on said spindles, rollers mounted on said spheres, means cooperating with said rollers and spheres to comprise a universal driving coupling, and a sun gear meshed with the first said gears.

17. In a transmission, in combination, opposed discs, rollers drivably connecting said discs and adapted to be controllably angulated therebetween, means mounting said rollers for planetization, a control member embracing said rollers and organized for rotation with said mounting means, and control means adapted to rotate said member relatively to said mounting means.

18. In a transmission, in combination, opposed discs, rollers movable to vary the drive ratio between said discs, means mounting said rollers for bodily rotation about the disc axis, a control member rotatable with and with respect to said mounting means and embracing said rollers, and control means connected with said member so as to cause unitary rotation thereof with said mounting means except as the control means is moved.

ROLAND CHILTON.